३,५०५,३०५
HEAT-STABLE HYDROXYMETHYLATED ROSIN DERIVATIVES AND PROCESS
Bernard A. Parkin, Jr., and Glen W. Hedrick, Lake City, Fla., assignors to the United States of America as represented by the Secretary of Agriculture
No Drawing. Filed Apr. 14, 1967, Ser. No. 630,841
Int. Cl. C08g 22/04; C09f 1/04
U.S. Cl. 260—97.5    6 Claims

ABSTRACT OF THE DISCLOSURE

The normal thermal addition of formaldehyde to rosin produces an unstable product which will liberate formaldehyde if the formaldehyde-modified rosin is heated in vacuo. Catalytic hydrogenation stabilizes this addition. Conversion of the carboxyl group to a methylol group by reduction using lithium-aluminum-hydride ($LiAlH_4$) gives a product which contains an average of about two hydroxyl groups per rosin molecule. The resultant hydroxymethylated derivatives of rosin are useful for modifying polyurethanes prepared from polyethers.

---

A nonexclusive, irrevocable, royalty-free license in the invention herein described, throughout the world for all purposes of the United States Government, with the power to grant sublicenses for such purposes, is hereby granted to the Government of the United States of America.

FIELD OF INVENTION

This invention relates to heat stable hydroxymethylated derivatives of rosin and a process for their preparation. More specifically, it relates to the preparation of heat-stable hydroxymethylated derivatives of abietic-type rosin acids (polyols) useful in the preparation of polyurethane plastics wherein the rosin is first reacted with paraformaldehyde and subsequently hydrogenated in the presence of hydrogenation catalysts such as a palladium-on-carbon catalyst. The resulting composition shows little if any absorption in ultraviolet (UV) indicating the absence of resin acid conjugated dienes. Subsequent treatment with lithium aluminum hydride converts the derivative to a polyol.

DEFINITION OF TERMS

As used herein, the term "rosin" includes gum, wood, and tall-oil rosins containing resin acids of the abietic-type. The color grades of rosin range from X (lightest), through WW (water white), WG (water glass), N, M, K, I, H, G, F, E, to D (dark).

The term "polyol" (diols) used in the specification and claims relates to hydroxyl compounds containing an average of two hydroxyl groups per mole in the composition.

The term "carbonyl groups of rosin" or "carbonyl groups" includes esters and carboxylic acids of the abietic type, i.e., abietic-type acids.

DESCRIPTION OF PRIOR ART

The reaction of rosin with formaldehyde has been used previously to modify rosin. This modification is principally the simple addition of formaldehyde to the double bond system in the acids in rosin and results in the formation of a methylol group (—$CH_2OH$). This has usually been done with mineral acid catalysts, such as phosphoric or sulfuric acids but formaldehyde does add to rosin without addition of these catalysts. E. E. Royals and I. I. Green, J. Org. Chem. 23, 1437 (1958), describe the addition of formaldehyde to abietic acid with catalyst which they stabilize by converting the reaction product to acetates and propionates. In rosin the reacting resin acid species which reacts with formaldehyde in a noncatalyzed reaction is believed to be limited to abietic-type acids and, furthermore, it appears to be limited entirely to abietic acid.

Formaldehyde in the absence of acid catalysts does not react with pimaric type acids nor dihydro- or dehydroabietic acids. To obtain addition of formaldehyde to rosin either the abietic-type acids such as palustric, neoabietic and abietic acids or the abietic acid which forms in situ, reacts to give a modified rosin. Addition of formaldehyde to rosin results in the introduction of one more methylol groups. If the carboxyl group is then reduced to a methylol group as by lithium aluminum hydride or copper chromite those molecules which are modified with formaldehyde will become polyols, i.e., possess two or more methylol groups and become valuable intermediates for polyurethane applications.

DISADVANTAGES OF THE PRIOR ART

One of the disadvantages of the prior art is the instability of the formaldehyde modified rosin which is due to the elimination of formaldehyde and is easily apparent by the presence of the odor of formaldehyde. This elimination is best demonstrated chemically when one heats the formaldehyde-rosin product while applying a vacuum. The heating will cause some of the carboxyl groups present to react with a hydroxyl group resulting in ester formation with an increase in neutral equivalent. Most of the remaining hydroxyl groups disappear due to the loss of formaldehyde. As will be discussed more fully in the examples below, when this thermally treated material is reacted with lithium aluminum hydride the carbonyl groups (ester and/or carboxylic) are converted to methylol groups and a hydroxyl determination affords a measure of the extent of loss of formaldehyde during the heating. When this loss of aldehyde is appreciable, the resulting product will be principally abietyl alcohol. Consequently, there is a need for a process for producing heat-stable hydroxymethylated rosin derivatives and products produced by the process.

SUMMARY OF THE INVENTION

We have now found that the formaldehyde addition product can be stabilized by simple hydrogenation of the formaldehyde-modified rosin using hydrogen and a hydrogenation catalyst such as a palladium-on-carbon catalyst. About one mole of hydrogen is absorbed per mole abietic acids. The hydrogenated material is stable thermally, and upon treatment with lithium aluminum hydride ($LiAlH_4$), the hydroxyl content is about like that expected based on the addition product of formaldehyde and rosin.

In general, the process of our invention involves the following steps wherein all parts in the specification and claims are by weight:

(a) Reacting 100 parts of at least one rosin selected from the group consisting of gum rosin, wood rosin, and tall oil rosin in a rocking pressure reactor with about 10 parts paraformaldehyde with rocking, at 120–150° C. for 4 to 5 hours, (b) Continuing the reaction until the temperature drops to about 100° C., (c) Recovering the molten rosin-formaldehyde addition products from the pressure reactor and cooling, preferably on a flat plate. The cooled product is Composition "A," which has N.E. about 390, OHE about 434, and a softening point of about 86.5 C., (d) Dissolving of step (c) in 95% ethanol, (e) Hydrogenating the composition of step (d) with about 0.15 weight percent of 5% palladium-on-carbon catalyst, said hydrogen being present at about 1000 p.s.i., and continuing said hydrogenation until the hydrogenated material shows little, if any, absorption in ultraviolet, indicating that it is essentially free of resin acid conjugated dienes (abietic type acids), (f) Removing the palladium-on-carbon catalyst from the ethanol solution of step (e) by any convenient physical means, such as filtration, (g) Diluting the filtered solution of step (f) with water to completely precipitate the hydrogenated product as an oil, (h) Stripping the solvent from the oil on a rotary evaporator at about 120° C. and about 25 mm. pressure (Hg) to give a resinous product. This resinous product is Composition "D" and is essentially free of abietic-type acids, (i) Recovering the resinous product (Composition "D") from the rotary evaporator by physical means known to those skilled in the art. Recovered Composition "D" may then be packaged and stored for future use, or it may be used in the preparation of Compositions "E" and/or "F" described below, (j) Heating the recovered product of step (i) (Composition "D") essentially free of abietic-type acids at about 275° C. for about 4 hours at about 4–5 mm. mercury pressure to form a mixture consisting of rosin esters and carboxylic acids. This is Composition "E" and has N.E. about 626, and is heat-stable (see Example 4), (k) Recovering Composition "E" formed in step (j) which requires no special recovery means, and may be recovered by physical means known to those skilled in the art. The recovered Composition "E" may be packaged and stored for future use, or it may be used in the preparation of Composition "F" as described below in Example 5, (l) Dissolving the recovered Composition "E" of step (k) in dry ether. One part Composition "E" and 4 parts dry ether cause good results to be obtained although we are not limiting the process to this ratio.

(m) Reducing the dry ether solution of rosin esters and carboxylic acids of step (l) by adding an ether solution of (LiAlH$_4$) to the ether solution of Composition "E" with rapid mixing and thereafter maintaining a period of dwell for about 15 hours at ambient temperature. The use of 3 parts LiAlH$_4$ in about 40 parts ether is good practice (but not a limiting practice) for reducing 5 parts Composition "E" in the dry ether solution, (n) Hydrolyzing the reduced product of step (m) by slowly adding the reduced product into a mixture of about 150 parts crushed ice and 20 parts concentrated hydrochloric acid with rapid stirring. Stirring is continued until all the solid, hydrolyzed product is dissolved, (o) Separating the ether and water layers formed in step (n) by physical means such as decantation, separatory columns or other means known to those skilled in the art, the aqueous layer containing lithium and aluminum chlorides and the ether layer containing the heat-stable hydroxymethylated derivatives of rosin, (abietyl polyols) (Composition "F"), (p) Washing the ether layer of step (o) with a small quantity of water, e.g., about 25 parts, about three times to remove unwanted impurities, such as chlorides, after which any residual water is removed from the ether solution by drying over anhydrous sodium sulfate, and (q) Recovering the hydroxymethylated derivatives of rosin (abietyl polyols) by distilling off the ether. This is Composition "F," and has OHE of about 199.

As will be noted below in Example 3, Composition "D," essentially free of abietic-type acids, is believed to be novel and is claimed herein. The process for its synthesis (steps (a) to (i), inclusive) are also claimed herein. The UV absorbency of Composition "D" at 252 millimicrons using 30 mg. "D" per liter of 95% ethanol with the procedure described below was 0.09 compared with 0.72 for Composition "A." The properties of "A" are given in Example 1.

As described below in Example 4, when Composition "D," essentially free of abietic-type acids, is heated at 275° C. for about 4 hours at 4–5 mm. mercury pressure, polyester groups are formed. This novel product (Composition "E") has N.E. about 626 compared with the rosin-formaldehyde composition of Example 1 which has N.E. about 390. Composition "E" and a process for its synthesis are embodiments of our invention and are claimed herein.

Composition "E" may be used to synthesize Composition "F" (see Example 5 below).

It will be noted in Example 2 below, that Composition "A" is not heat stable whereas the hydrogenated rosin (Composition "D") of Example 4, is heat stable. The specific quantities used in the above steps are detailed in the examples below.

TEST PROCEDURES

In the following examples temperatures are in centigrade degrees; B.P. is boiling point; mm. is millimeters pressure (mercury); OHE or (OHE) is hydroxyl equivalent and was determined by the method of C. L. Ogg, W. L. Porter, and C. O. Willits, Ind. Eng. Chem., Anal. Ed., 17, 394 (1945). The procedure follows:

Mixed indicator solution

Consists of one part of 0.1% aqueous cresol red neutralized with sodium hydroxide and three parts 0.1% thymol blue neutralized with sodium hydroxide.

*Procedure.*—Weigh a sample containing about 1–2.5 milliequivalents of hydroxyl and introduce into a glass-stoppered iodine flask. Add 3.00 ml. of freshly prepared acetylating reagent (1 volume of acetic anhydride to 3 volumes of pyridine) using a pipet or some other means of accurate measurement. Moisten the glass stopper with pyridine and seat loosely, and then place the flask on a steam bath and heat for 45 minutes. Add 5–6 ml. of water and swirl to mix thoroughly. Continue heating for 2 minutes and then cool in tap water. Rinse down the stopper and sides of the flask with 10 ml. of butyl alcohol, and then add a few drops of indicator and titrate with the standard sodium hydroxide (0.5 N). Make a blank determination on the reagent simultaneously and similar in all respects.

If the sample contains any free acid or alkali, this should be determined separately and corrected for in the calculation.

*Calculation.*—

$$\% \, OH = \frac{(\text{titration of bank} - \text{titration of sample}) \cdot N \cdot 1.701}{\text{Weight of sample}}$$

where N=normality of NaOH solution.

(N.E.) or n.e. is neutralization equivalent. It should be noted that (N.E.) is not always equal to the molecular weight (M.W.). HaE is active hydrogen equivalent, i.e., the grams of the sample required to evolve 1 mole of hydrogen on treatment with excess lithium aluminum hydride (LaAlH$_4$); p.s.i.g. or p.s.i. is pounds per square inch gage; mm. is millimeters; Pd-C (5%) is 5% palladium-on-carbon catalyst.

Determinations of the ultraviolet absorption spectra were made using the Bausch and Lomb "Spectronic 505" recording spectrophotometer on solutions containing 20–200 mg. of sample per liter of 95% ethanol and a cell path of one centimeter. Infrared wave length ($\lambda$) maximum is determined by means of a Perking-Elmer Model No. 21 infrared spectrometer using a carbon tetrachloride solution of 20 mg./ml. concentration and a cell path of 0.466 mm.

The apparatus and method of the shouldered ring-and-ball softening point determination are described in A.S.T.M. E28–42T.

Example 1

The following example shows the preparation of hydroxymethylated rosin by the addition of paraformaldehyde to rosin.

WG grade gum rosin (1000 grams having N.E. 346) was charged in a rocking pressure reactor with 100 grams powdered formaldehyde and heated at 150° C. with rocking for 4 to 5 hours. The reaction was continued until the temperature had dropped to 100° C. after which the bomb was opened and the molten rosin-formaldehyde composition was poured to cool on a flat plate. The product was a friable resin (Composition "A") containing free formaldehyde (N.E. 390; OHE 434; 3.9% hydroxyl; ring-and-ball softening point 86.5° C.).

This shows that the N.E. has increased due to the formation of some monohydroxyl groups on the rosin.

Example 2

The following example shows that the rosin-formaldehyde product (Composition "A") is unstable to heat.

A portion of Composition "A" (100 grams) was heated at 275° C. under vacuum (4 to 5 mm.) for 4 hours. The product (Composition "B") darkened considerably and had a N.E. of 488.

When Composition "B" was reduced with lithium aluminum hydride (LiAlH₄) a product (Composition "C") was obtained having a hydroxyl equivalent of 278.7; 6.1% hydroxyl. This compares with the calculated value for an alcohol from rosin (one hydroxyl) having N.E. 346, OHE 332; 5.1% hydroxyl, and indicates the formation of a small amount of polyols by conversion of carboxyl groups to hydroxyl groups.

Example 3

In the following example another portion (100 grams) of hydroxymethylated rosin prepared by the addition of formaldehyde to the gum rosin in Example 1 above (Composition "A") was dissolved in 95% ethanol and hydrogenated over palladium catalyst using 0.15% of 5% palladium-on-carbon (on the weight of Composition "A") at 1000 p.s.i. hydrogen. The hydrogenation mixture was filtered to remove the catalyst. The solution was then diluted with water to completely precipitate the product as an oil. This oil was stripped of solvent on a rotary evaporator at 120° C. at 25 mm. pressure (Hg) to give a resinous product (Composition "D"). The hydrogenated product (Composition "D") showed little, if any, absorption in the ultraviolet (UV) spectrum indicating that it was essentially free of abietic-type acids. A comparison of the absorption characteristics of Compositions "A" and "D," 30 mg. per liter of 95% ethanol, using a UV spectrophotometer and a 1 cm. cell path, showed absorbencies of 0.72 and 0.09, respectively, at 252 mμ. (millimicrons).

Composition "D" and the process for its preparation form an embodiment of our invention and are claimed herein.

Example 4

In the following example, novel Composition "D," free of abietic-type acids, was heated at 275° C. for four hours at 4–5 mm. Hg pressure. The resulting product (Composition "E") requires no special recovery means and had N.E. about 626 which indicated that the formation of polyester and carboxylic acid groups during the heating step. While we are not so limiting our invention, one explanation for the formation of these polyesters is due to the formation of ester linkages between the carboxyl- (—COOH) groups and the methylol (—CH₂OH) hydroxyls formed when formaldehyde is reacted with the rosin.

Compositon "E" is within the scope of our invention, is believed to be new, and is claimed herein.

Example 5

In this example, Composition "E" is reduced with LiAlH₄, then hydrolyzed to polyols (diols).

Five parts of Composition "E" was dissolved in 20 parts by volume of dry ether, and the resultant solution was added with rapid mixing to a solution of 3 parts of lithium aluminm hydride (LiAlH₄) in 40 parts ether. The mixture was allowed to stand overnight at room temperature and was then hydrolyzed by pouring it slowly into a rapidly stirred mixture of 150 g. crushed ice and 20 parts concentrated hydrochloric acid. After the solid had dissolved, the ether layer was separated using a separatory funnel, washed with 25 parts of water 3 times, and dried over anhydrous sodium sulfate. The dried ether solution containing the diols (polyols) was then filtered to remove unwanted solids. The solids (Composition "F") were then recovered by evaporation of the ether solvent. The absence of carbonyl absorption bands in the infrared spectrum of Composition "F" in a carbon tetrachloride solution at 20 mg./ml. concentrations using a cell path of 0.46 mm. on a Perkin-Elmer 21 infrared spectrophotometer indicated complete reduction of the carboxyl group had taken place.

Composition "F" is a very viscous, almost resinous material with OHE 199, 8.6% hydroxyl. (Calculated for diol from rosin N.E. 346, with 3.9% added hydroxy OHE is 179.5, 9.0% hydroxyl). Compound "F" is believed to be novel, is claimed herein, and the process for its synthesis is also claimed. As noted above, it is useful for modifying polyurethanes prepared from polyethers.

Composition "D" may be substituted for Composition "E" in the process of Example 5. When this substitution is made, the resultant Composition "F" has properties generally similar to Compostion "F" synthesized from Composition "E."

Substitution of equivalent amounts of tall oil or wood rosin in place of the gum rosin of Example 1 causes generally similar Compositions "D," "E," and "F" to be obtained.

It will thus be seen that rosin (gum, tall oil, or wood) may be converted to a hpdroxymethylated product by reaction with formaldehyde (Composition "A"). "A" may be hydrogenated in 95% ethanol over a hydrogenation catalyst such as palladium-on-carbon catalyst to produce a product essentially free of abietic-type acids (composition "D"). Heating Composition "D" at about 275° C. for about 4 hours at 4–5 mm. mercury (Hg) pressure produces a product having N.E. about 626 indicating the formation of polyester groups during the heating step with the formation of Composition "E." Upon treating with LiAlH₄ either Composition "D" or "E" is converted to Composition "F" to the extent of about 95.5%, when calculated as "diol."

As will be observed in the following examples, the polyol may be blended with a polymer of propylene glycol having an average molecular weight of 2000 and hereinafter referred to as polypropylene glycol 2000 to form a flexible film, somewhat elastic and very tough, and almost impossible to tear.

Example 6

In the following example, a polyol (diol) prepared from paraformaldehyde modified rosin by the general procedures of Examples 1, 3, and 5 was used as a portion of the polyol in the preparation of a plastic film. Composition "F" 13.2 grams (OHE 230, 0.057 equivalent) and 20 grams (0.01 mole) polypropylene glycol 2000 were heated to 100° C. under about 2 mm. pressure to degas. A commercial tolylene diisocyanate (toluene-1,4-diisocyanate) 9.5 g. (0.055 mole) was added to the degassed material, mixed and held at 75° C. for about 20 minutes then 1.5 g. (0.0125 mole) of trimethylolpropane was mixed in, and the mixture degassed again. (Note: the alcohols and diisocyanate are present in approximately equivalent amounts.) N-methylmorpholine, a curing agent, 12 drops, was added and the magma poured onto aluminum foil for curing by setting on a hot plate adjusted so that the surface temperature was 110° C. to 120° C. After a couple hours curing an amber colored, dioxane insoluble, clear polymer resulted. At room temperature, it was a flexible film, somewhat elastic, very tough, and almost impossible to tear.

Substitution of a Composition "F" which is prepared from wood rosin or tall oil rosin in place of the gum rosin used above causes generally similar tough and flexible films to be obtained.

In the following example, Examples 7 and 8, the composition "F" was omitted.

Example 7

Polypropylene glycol 2000, 30 g. (0.015 mole, 0.03 equiv.) trimethylolpropane 1.5 g. (0.0125 mole, 0.037 equiv.), tolylene diisocyanate 4.8 g. (0.027 mole, 0.054 equiv.) were treated as above in Example 6 and cured with 6 drops of N-methylmorpholine by heating on aluminum foil at 110–120° C. The polymer was insoluble in dioxane, colorless and clear but *very soft and sticky at room temperature.*

Example 8

Polypropylene glycol 2000, 20 g. (.01 mole), polyethylene glycol 200, 6 g. (0.03 mole), trimethylolpropane 1.5 g. (0.0125 mole) and tolylene diisocyanate 9.5 g. (0.055 mole) were degassed, heated and cured as in Example 6.

*The cured polymer was soft and sticky.*

The rosin modified polymer of Example 6 is a much better polymer than obtained in Examples 7 and 8.

Hardness or softness of the rosins of Examples 6, 7, and 8 was determined by measuring the time required to cause a sharp needle to penetrate a piece of plastic to a depth of one-eighth inch, using a force of 1000 grams (a 1000-gram weight) on the needle.

Plastics prepared in Example 6 required 15 seconds while the plastics prepared in Examples 7 and 8 required only 3 seconds.

We claim:

1. A process for the preparation of heat stable formaldehyde addition products of rosin which are useful in the preparation of rosin based polyols comprising:
   (a) reacting in a closed system at a temperature of about from 120° C. to 150° C. and for a period of about from 4 to 5 hours, 100 parts by weight of rosin and 10 parts by weight of formaldehyde to produce a rosin-formaldehyde addition product having a neutralization equivalent of about 390, a hydroxyl equivalent of about 434, and a softening point of about 86.5° C.
   (b) hydrogenating the product of step (a) in ethanol solution with about 0.15 weight percent of a 5% palladium-on-carbon catalyst and hydrogen pressure of about 1,000 pounds per square inch until the hydrogenated material exhibits essentially no absorption in the ultra violet region,
   (c) separating the hydrogenated product of step (b) from the palladium catalyst, water washing, and recovering the separated water washed hydrogenation product.

2. The product produced by the process of claim 1.

3. A process for the preparation of heat stable formaldehyde addition products of rosin which are useful in the preparation of rosin based polyols, comprising:
   (a) reacting in a closed system at a temperature of about from 120° C. to 150° C. and for a period of about from 4 to 5 hours, 100 parts by weight of rosin and 10 parts by weight of formaldehyde to produce a rosin-formaldehyde addition product having a neutralization equivalent of about 390, a hydroxyl equivalent of about 434, and a softening point of about 86.5° C.,
   (b) hydrogenating the product of step (a) in ethanol solution with about 0.15 weight percent of a 5% palladium-on-carbon catalyst and hydrogen pressure of about 1,000 pounds per square inch until the hydrogenated material exhibits essentially no absorption in the ultraviolet region,
   (c) separating the hydrogenated product of step (b) from the palladium catalyst, water washing, and recovering the separated water washed hydrogenation product, and
   (d) heating the product of step (c) at about 275° C. for about 4 hours at about from 4 to 5 millimeters of pressure to form a mixture of rosin esters and acids which exhibit a neutralization equivalent of about 626.

4. The product produced by the process of claim 3.

5. A process for the preparation of rosin based polyols comprising:
   (a) reacting in a closed system at a temperature of about from 120° C. to 150° C. and for a period of about from 4 to 5 hours, 100 parts by weight of rosin and 10 parts by weight of formaldehyde to produce a rosin-formaldehyde addition product having a neutraliaztion equivalent of about 390, a hydroxyl equivalent of about 434, and a softening point of about 86.5° C.
   (b) hydrogenating the product of step (a) in ethanol solution with about 0.15 weight percent of a 5% palladium-on-carbon catalyst and hydrogen pressure of about 1,000 pounds per square inch until the hydrogenated material exhibits essentially no absorption in the ultra violet region.
   (c) separating the hydrogenated product of step (b) from the palladium catalyst, water washing, and recovering the separated water washed hydrogenation product,
   (d) heating the product of step (c) at about 275° C. for about 4 hours at about from 4 to 5 millimeters of pressure to form a mixture of rosin esters and acids which exhibit a neutraliaztion equivalent of about 626,
   (e) reacting at room temperature and in ether solution the product of step (d) with lithium aluminum hydride for a period of about 15 hours.
   (f) hydrolyzing the product of step (e) with a mixture of about 150 parts of crushed ice and 20 parts of concentrated hydrochloric acid,
   (g) separated the ether layer which forms during the hydrolyzing step (f), and
   (h) recovering the product dissolved in the ether layer by volatilizing the ether to obtain a product having a hydroxyl equivalent of about 199.

6. The product produced by the process of claim 5.

References Cited

UNITED STATES PATENTS

| | | | |
|---|---|---|---|
| 2,400,607 | 5/1946 | Segesserman | 260—100 |
| 2,662,881 | 12/1953 | Batdorf | 260—100 |
| 2,720,514 | 10/1955 | Rummelsburg | 260—97.5 |
| 2,744,889 | 5/1956 | Gayer | 260—100 |
| 2,776,276 | 1/1957 | Glasebrook et al. | 260—97.5 |
| 2,891,024 | 6/1959 | Putnam | 260—100 |
| 2,906,745 | 9/1959 | Levering | 260—100 |

OTHER REFERENCES

Journal of American Chemical Society, 1960, pp 1362–1367 relied on.

DONALD E. CZAJA, Primary Examiner

W. E. PARKER, Assistant Examiner

U.S. Cl. X.R.

260—97.6, 100, 468.5